May 9, 1961 A. J. ROHM 2,983,700
RESINOUS COMPOSITION COMPRISING A POLYAMIDE AND AN
ORGANOSILOXANE RESIN AND CONDUCTOR
COATED THEREWITH
Filed Jan. 15, 1957

WITNESSES:
Bernard R. Gieguy
Charles L. Board

INVENTOR
Alfred J. Rohm
BY
Frederick Shafer
ATTORNEY 2,983,700

RESINOUS COMPOSITION COMPRISING A POLYAMIDE AND AN ORGANOSILOXANE RESIN AND CONDUCTOR COATED THEREWITH

Alfred J. Rohm, North Braddock, Pa., assignor to Westinghouse Electric Corporation, East Pittsburgh, Pa., a corporation of Pennsylvania Filed Jan. 15, 1957, Ser. No. 634,275

12 Claims. (Cl. 260—42)

This invention relates to synthetic resin compositions, and insulated wire and other products produced therewith.

It is well known to those skilled in the art that the requirements imposed on enamel coatings on wire are so severe and critical that very few, if any, other applications for resinous materials set as high a standard. Enamel coatings on wire must be both tough and hard in order to withstand the severe mechanical abuse to which the wire is subjected in service. Coils are often wound from enameled wire under considerable tension and at high speeds. The enamel must withstand the abrasion, the bending stresses, and the heavy unit pressures encountered without disrupting from the wire or cracking. In many cases, the copper conductor is severely deformed beyond the elastic limit by such operations. Thus in automatic coil winding machines, such as are used in winding electric motors, enameled wire may be twisted, stretched and bent to such an extent that the copper wire may be elongated 10% and more. A good enamel coating on the wire must withstand this abuse without separating from the wire, breaking, or cracking.

Other conditions must be met by a resinous composition before it can be considered entirely satisfactory for application to wire to provide an insulating enamel coating thereon. It must be capable of being dissolved in commercially available solvents to produce wire enamel solutions having a relatively high resin solids content without excessive viscosity. Wire enamels so prepared should exhibit stability in storage for long periods of time so that marked changes or precipitation do not occur. The wire enamel solutions when applied to wire should be capable of being satisfactorily baked or heat treated within a reasonably wide range of temperatures in the process of curing the resin composition on the wire. The applied baked coating of resin should be smooth and free from pinholes or other flaws. Furthermore, a thin coating of the cured enamel should possess a high dielectric strength and have desirable electrical insulating properties.

In evaluating coatings of enamel on a wire, the art has accepted certain tests as indicative of the merit of such enamels. A primary test employed by the art today is designated as the scrape value test. The scrape value indicates the relative hardness and toughness of an enamel. The scrape value is determined by passing the enameled wire under a loaded knife-edge, and increasing the load until it is sufficient to cause the knife-edge to cut through the enamel, the least load in ounces doing so is designated as the scrape value. It is believed that the scrape testing machine disclosed in C. B. Leape et al. Patent 2,372,093 gives the most accurate scrape values of any device known at the present time, being reproducible to within one ounce. The scrape values indicated hereinafter have all been determined with this machine. It may be stated that any commercially usable enameled wire should have a scrape value of at least 15 ounces and preferably higher than 20 ounces for single build thickness coating on A.W.G. size 20 wire and proportionate values for other wire sizes. Values of 30 ounces and higher for wire of the order of size 20 are exceptional.

The relative solvent and hot-varnish resistance of the enameled wire is indicated by the change in scrape value after subjecting an enameled wire to the action of various solvents for selected periods of time. Of two enamels the one that changes the least in scrape value after being immersed or 24 hours or more in a given solvent is stated to have the higher resistance to the solvent.

Other tests are usually applied to enameled wire to indicate certain other desirable characteristics. The "quick-jerk" test is applied to enameled wire by giving the wire a quick jerk to cause it to break. The enamel should be substantially continuous, without exhibiting cracks, up to the point of the break. This test indicates the adherence of the enamel to the wire as well as the elasticity of the enamel, both being desirable characteristics. The "heat-shock" test consists in winding a coil over a conical mandrel or a mandrel having various diameters, the smallest diameter being the same as the wire being tested, and placing the coil in an oven at elevated temperature. The smallest diameter mandrel that the wire can be wound on without cracking after placing in the oven is an indication of the relative abuse that the wire can stand in manufacture and service without failure. Electrical tests to indicate dielectric strength are employed to indicate the relative electrical insulating merits of the resin coatings.

The object of this invention is to provide a synthetic polyamide-organosiloxane resinous composition, which when applied to a conductor and cured, produces insulating enamel coatings having outstanding physical and electrical properties.

Another object of this invention is to provide a synthetic polyamide resinous composition, which when applied to a conductor and cured, produces insulating enamel coatings having good physical and electrical properties.

Another object of this invention is to provide electrical conductors insulated with a synthetic polyamide-organosiloxane resinous composition.

A further object of this invention is to provide a process for producing resinous compositions of a polyamide and an organosiloxane resin.

For a fuller understanding of the nature and objects of the invention, reference should be had to the following detailed description and drawing, in which.

Figure 1:
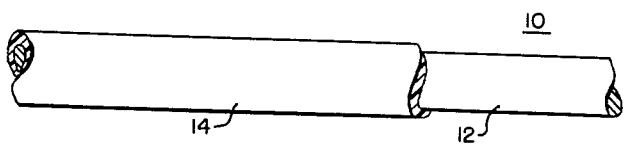
Figure 1 is a fragmentary view in elevation, partly broken, of an enameled conductor.

In accordance with this invention, resinous compositions have been prepared having outstanding physical and electrical properties, particularly for the preparation of enameled wire and similar insulated conductors, by modifying certain polyamide resinous compositions with certain organosiloxane resin compositions. The application of these resinous compositions has resulted in enameled wire of outstanding properties, which enameled wire has been found suitable for use under many extreme and diverse conditions met with in the electrical industry. Particular characteristics of the compositions will be disclosed hereinafter.

The resinous composition of this invention is prepared by admixing (A) from 1 part to 50 parts by weight of a solvent soluble, heat-hardenable organosiloxane resin with (B) 100 parts by weight of a polyamide reaction product to be detailed hereinafter.

The organosiloxane resins that have been found particularly satisfactory are the phenyl methyl polysiloxanes having from 1.3 to 1.95 phenyl and methyl groups per silicon atom. Particularly good results are obtained with organosiloxanes having a total of from 1.5 to 1.8 phenyl and methyl groups per silicon atom. It has been found that the phenyl groups may be replaced with up to 50% of diphenyl groups with equally good results. It will be understood that other heat-hardenable organosiloxanes having other organic groups than phenyl and methyl groups may be employed to replace a small part thereof. Therefore, the phenyl methyl organosiloxanes may comprise a small proportion, for example, up to 10 mole percent of other organic groups such as tolyl, allyl, ethyl and the like. The organosiloxane resins are soluble in toluene, xylene and other aromatics or mixtures of two or more. Other solvents are also available and known in the art.

The polyamide employed in preparing the resinous composition of this invention has the generic formula

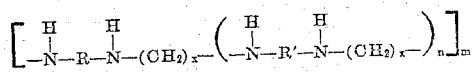

where $m$ represents an integer having a value of two or more, and $n$ is 0 or an integer. R represents the residue of an ethylenically unsaturated dicarboxylic acid after removal of the hydroxyl groups. R' represents the residue of isophthalic acid, terephthalic acid, or an aliphatic dicarboxylic acid with the hydroxyl groups removed, said aliphatic dicarboxylic acid having no ethylenic unsaturation and having at least two and not more than eight non-carboxyl carbon atoms.

The polyamide is derived by admixing and heating to reaction (a) at least one acidic compound selected from the group consisting of ethylenically unsaturated dicarboxylic acids and anhydrides thereof and (b) at least one diamino compound selected from the group consisting of primary hydrocarbon diamines and polyamide reaction products derived by reacting a primary hydrocarbon diamine and at least one dicarboxylic acid, selected from the group consisting of isophthalic acid, terephthalic acid and saturated aliphatic dicarboxylic acids having from 2 to 8 non-carboxyl carbon atoms, having terminal amino groups. For each mole of diamino compound there is provided from about 1 mole to 2 moles of the acidic compound.

Examples of suitable ethylenically unsaturated dicarboxylic acids and anhydrides thereof are maleic acid, maleic anhydride, fumaric acid, citraconic acid and citraconic anhydride. It will be understood that esters of the above mentioned acids and anhydrides may be substituted for all or a part thereof of the reaction with the diamino compound. For example, dibutylmaleate may be substituted for all or a part of maleic acid.

The primary hydrocarbon diamines employed should have at least two and no more than six methylene groups. Examples of suitable primary diamines are ethylene diamine, 1,3-propane diamine, 1,4-butane diamine and hexamethylene diamine.

The polyamide reaction products having terminal amino groups that may be employed in place of the above mentioned primary diamines are those derived by reacting an excess of at least one of the primary diamines mentioned above with an aliphatic dicarboxylic acid or anhydride thereof having at least two and no more than eight non-carboxyl carbon atoms and having no other reactive groups than the carboxyl groups or anhydride groups. Examples thereof are adipic, succinic, glutaric, and the above mentioned dicarboxylic acids may be replaced in whole or in part by isophthalic acid or terephthalic acid. The preparation of the above mentioned polyamide reaction products is carried out by heating the mixture in a non-reactive solvent. To insure the presence of terminal amino groups in the reaction product, there is employed from about 0.1 mole to 0.9 mole of dicarboxylic acid for each mole of the primary hydrocarbon diamine. In the preparation of the above polyamides it is preferred to employ a high boiling point solvent such as cresol, dichlorobenzene or the like. These solvents do not enter into the reaction but provide a common solvent for the reactants and further prevent the primary diamine from evaporating from the mixture when the mixture is heated. When polyamides with terminal amino groups are employed as the diamino compound to prepare the polyamide used in the resinous composition of this invention, it is preferred to employ those having an average molecular weight of not in excess of 1500.

The polyamide derived by reacting the diamino compound with an unsaturated dicarboxylic acid admixed with the solvent soluble, heat-hardenable organosiloxane resins to form the resinous composition of this invention can be applied to wire and when cured produces a hard tough enamel coating. Flexibility of the cured enamel coatings is increased by admixing with the organosiloxane resin the longer chain polyamides.

The following examples are illustrative of the preparation of the resinous compositions of this invention. All parts are by weight.

*Example I*

The following were introduced into a closed reaction vessel provided with a condenser:

| | Parts | |
|---|---|---|
| Hexamethylenediamine, 80% aqueous solution | 310 | (2.0 moles) |
| Cresol | 200 | |
| Isophthalic acid | 200 | (1.2 moles) |

The mixture was stirred and heated slowly until the temperature of the mixture reached 240° C. This temperature was maintained until substantially all the water had been removed from the mixture by operation of the condenser. The mixture was cooled to approximately 190° C. and then sparged with nitrogen until all the air was replaced by the nitrogen while the temperature of 190° C. was maintained. After the sparging had been completed, 273 parts (1.2 moles) of dibutylmaleate dissolved in 250 parts of cresol were added to the mixture. The mixture was then heated to approximately 165° C., which temperature was maintained for about 1½ hours. The temperature of the mixture was then gradually increased to 185° C. during the succeeding two hours, during which time between 60 parts and 80 parts of butanol distilled off.

One hundred parts of a 60% solution of phenyldiphenyl-methyl siloxane resin in xylene were then added to the mixture to form a resinous composition. The R to Si ratio was about 1.5 and the phenyl, diphenyl and methyl groups were present in approximately equal proportions. The resinous composition was then diluted by adding 300 parts dichlorobenzene and 600 parts of butyl alcohol.

No. 13 (A.W.G.) copper wire was coated with six dips in the diluted resinous composition in a wire enameling tower having an oven maintained at 825° F. The cured resin enamel on the wire was smooth and hard, and it has a scrape test value of from 45 to 55 ounces as determined on the scrape tester described in Patent 2,372,093. The enameled wire successfully passed the quick jerk and heat shock tests, and it showed high resistance to hot impregnating varnishes and varnish solvents such as toluene. The enameled wire was wound around a mandrel having the same diameter of the enameled wire and was aged for 4 weeks at 200° C. without cracking or otherwise exposing the copper wire.

*Example II*

The phenyl-diphenyl-methyl siloxane resin of Example I was replaced in equal weight by a phenyl methyl siloxane to form a resinous composition. The R to Si ratio was approximately 1.4 and the ratio of methyl to phenyl groups was about 2 to 1. Copper wire was enameled in a tower with this composition and the resulting applied enamel coating was found to be comparable to that of Example I.

A number of other heat hardenable phenyl methyl siloxane resins having R to Si ratios of from 1.3 to 1.95, and phenyl to methyl ratios of from 1:4 to 2:1 were substituted in equal weight proportions for the phenyl-diphenyl-methyl siloxane of Example I. In each instance the wire enamel composition so produced, when applied to wire exhibited closely similar properties.

*Example III*

The following were introduced into a closed reaction vessel provided with a condenser:

|  | Parts |
|---|---|
| Hexamethylenediamine, 80% aqueous solution | 310 |
| Cresol | 200 |
| Isophthalic acid | 200 |

The mixture was stirred and heated slowly until the temperature of the mixture reached 240° C. This temperature was maintained until substantially all the water had been removed from the mixture. The mixture was cooled to approximately 190° C. and then sparged with nitrogen until the air was replaced by the nitrogen while the temperature of 190° C. was maintained. After sparging, the mixture was cooled to approximately 150° and a solution of 79 parts of maleic anhydride dissolved in 300 parts of dichlorobenzene was added to the mixture. The temperature of the mixture was gradually increased to 160° during the next hour, and in the next succeeding hour the temperature of the mixture was gradually raised to approximately 165° C.

To the mixture was then added 200 parts of dichlorobenzene and 100 parts of a 60% solution of the phenyl-diphenyl-methyl siloxane resin of Example I in xylene to provide a dilute solution of the resinous composition. Copper wire was enameled in a tower with this composition and the resulting applied enamel coating was found to have good flexibility and was of acceptable toughness and hardness as determined by the scrape abrasion test. The enamel met all requirements and was comparable to the enamel of Example I.

*Example IV*

The procedure of Example III was followed with the exception that 91 parts of fumaric acid dissolved in 300 parts of dichlorobenzene were substituted for the 79 parts of maleic anhydride dissolved in 300 parts dichlorobenzene. The resulting wire enamel exhibited properties similar to that of Example I.

*Example V*

Into a closed reaction vessel provided with a condenser were introduced 310 parts of 80% aqueous solution of hexamethylenediamine and 200 parts of cresol. The temperature of the mixture was raised slowly to approximately 190° C. with stirring. The temperature was maintained until substantially all water was removed from the mixture through a condenser. To the mixture were added 456 parts of dibutylmaleate dissolved in 200 parts of cresol. The mixture was then heated gradually to a temperature of approximately 170° C., at which temperature the mixture was maintained for 2 hours. The temperature was then gradually raised to 185° C. in the next succeeding hour. During this time about 50 parts of butanol was distilled from the mixture. To the mixture in the reaction vessel was then added the following: 300 parts of dichlorobenzene, 250 parts of the phenyl-diphenyl-methyl siloxane resin of Example I, 300 parts of butanol, and 200 parts of xylene. Copper wire was enameled in a tower with this composition and the resulting applied enamel coating was found to have better heat stability than the enamels of Examples I and II. The flexibility was good and the enamel was of acceptable toughness and hardness as determined by the scrape abrasion and other tests.

It has further been found that the polyamide composition of Example I without the addition of the heat-hardenable organosiloxane resin produces an exceptionally good enamel although it does not possess the heat stability of the enamel of Example I. Thus, a good wire enamel is prepared by admixing and heating to reaction, in a manner similar to that set forth in Example I, from 1 mole to 1.6 moles of isophthalic acid and from 0.4 mole to 1.6 moles of dibutylmaleate for each 2 moles of hexamethylenediamine. Two moles of hexamethylenediamine and from 1 mole to 1.6 moles of isophthalic acid are admixed and heated to reaction. To this reaction product there is then admixed from 0.4 to 1.6 moles of dibutylmaleate and this mixture is heated to reaction.

*Example VI*

Polyamide resinous compositions suitable for use as wire enamels were prepared in a manner similar to that of Example I without the addition of a heat-hardenable organosiloxane resin. The following resins were prepared using the amounts of reactants as shown:

|  | HEXAMETHYLENEDIAMINE | ISOPHTHALIC ACID | DIBUTYLMALEATE |
|---|---|---|---|
| Resin 1 | moles 2 | 1.2 | 1.2 |
| Resin 2 | do 2 | 1.2 | 0.8 |
| Resin 3 | do 2 | 1.6 | 0.4 |
| Resin 4 | do 2 | 1.6 | 0.8 |
| Resin 5 | do 2 | 1.0 | 1.0 |

Copper wire was enameled in a tower with the above resinous compositions and the resulting applied enamel coatings were found to have good physical properties. They did not, however, possess as good heat stability as the resinous compositions of the other examples.

The resinous compositions disclosed herein may be applied to electrical conductors composed of metals such as copper, silver, steel, aluminum or the like, or to carbon or graphite members or to other materials. Referring to Fig. 1 of the drawing, there is illustrated a conductor 10 comprising a copper conductor 12 coated with the hard, tough, solid resinous film 14 produced by applying a solution of the resinous composition of this invention thereto and curing by suitable baking or heat treatment. It will be understood that the coatings may be applied by any suitable means such for example as by dipping, die-coating, extrusion, or the like. After curing by baking, the resinous film 14 will be found to adhere tenaciously to the copper conductor 12. While the conductor 12 is illustrated as being of circular shape, it will be understood that it may be of any other desirable shape, such as square, rectangular or flat strip, or it may be composed of twisted or braided wire or the like. The enamel composition may have disposed therein suitable fillers, such as finely divided mica, silica, and iron oxide or coloring materials or the like.

Figure 2:
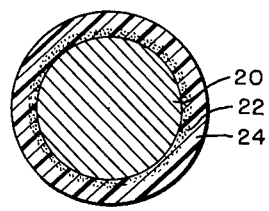
Fig. 2 is a cross section through a conductor embodying glass fibers and the resinous compositions of the present invention.

The compositions of this invention may be applied to electrical conductors such as wire, in combination with coatings of both organic and inorganic fibrous materials. One form of this modification of the invention is illustrated in Fig. 2 of the drawing showing an electrical conductor 20 of copper, for example, carrying a layer 22 of fibrous material which may be glass fibers, polyethylene terephthalate fibers, asbestos fibers, paper, cotton or silk or the like. The fibrous materials may be simply wrapped on the conductor, or applied in braided or woven form. Various combinations of fibrous materials may be applied. The fibrous layer 22 ordinarily will be applied to the conductor 20 and the resinous copolymer compositions of this invention applied over the fibrous layer by dipping, die-coating or the like until the fibrous material is saturated and the coatings are then baked to cure the resin. It will be appreciated that the copper conductor may be pretreated with an adhesive composition in order to adhere the layer 22 thereto. Such adhesive composition may comprise an initial tacky coating of the composition of this invention or other resinous compositions such, for example, as polyvinyl alcohol, organosiloxane resins and the like.

Figure 3:
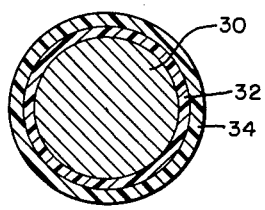
Fig. 3 is a view in cross section showing a modified form of insulated conductor.

The resinous compositions of the present invention may be applied to wire in combination with coatings of other resinous compositions. As illustrated in Fig. 3 of the drawing, the conductor 30 may carry an initial layer 32 composed of a coating of the resinous compositions disclosed herein and a superposed coating 34 of another resin. The coating 34 may be composed of an organosiloxane resin, polyvinyl acetals, phenol formaldehyde, and other resinous compositions or admixtures thereof. In some instances, the order of application of coatings may be reversed over that shown in Fig. 3 so that the uppermost or outer coating comprises the resins of this invention and the underlying coating comprises another resin.

It has been found that the cured resinous composition of the present invention has a high degree of thermal stability not possessed by many conventional organic resins. It is superior to phenol formaldehyde and other resins in the ability to withstand prolonged heating at elevated temperatures. If protected from oxygen the cured copolymer composition will withstand temperatures of the order of 150° C. and even higher, for hundreds and thousands of hours with very little deterioration in toughness, hardness or other physical properties.

While the preparation of enameled wire has been emphasized, it should be understood that the resinous compositions disclosed herein possess properties that indicate their suitability for many other applications. Sheets of metal may be coated with the resinous compositions and they will be found useful for withstanding weathering and other conditions. Containers for handling various liquids and food products may be coated with the resinous composition. The effect of foods, acids and other materials is negligible on the resin compositions after they have been fully cured by heat treatment. It will be further understood that protective and decorative coatings to be applied to metal, ceramics, glass, plastics, fabrics and other materials may be prepared from the resinous compositions.

Since certain obvious changes may be made in the above procedures and different embodiments of the invention may be made without departing from the scope thereof, it is intended that all matter contained in the above description and drawing shall be interpreted as illustrative and not in a limiting sense.

I claim as my invention:

1. An insulated conductor comprising, in combination, an electrical conductor and solid resinous insulation applied to the conductor, the resinous insulation comprising a heat-treated resinous composition of (A) 100 parts by weight of a polyamide resin composition derived by admixing and heating (1) from about 1 mole to 2 moles of an unsaturated acidic compound selected from the group consisting of maleic acid, maleic anhydride, fumaric acid, dibutylmaleate and the monomethyl substitution derivatures for the noncarboxyl hydrogen thereof and (2) one mole of a polyamide reaction product having terminal amino groups and having an average molecular weight of not in excess of 1500, said polyamide having terminal amino groups being derived by reacting one mole of a primary hydrocarbon diamine having from 2 to 6 carbon atoms, and from 0.1 mole to 0.9 mole of a dicarboxylic acid selected from the group consisting of isophthalic acid, terephthalic acid, and aliphatic dicarboxylic acids and anhydrides thereof having no ethylenic unsaturation and having at least two and no more than eight noncarboxyl carbon atoms, the acids having no other reactive groups than the carboxyl groups and the anhydrides having no other reactive groups than the anhydride groups and (B) from 1 part to 50 parts by weight of a solvent soluble, heat-hardenable organosiloxane resin having from 1.3 to 1.95 hydrocarbon groups per silicon atom.

2. An insulated conductor comprising, in combination, an electrical conductor and solid resinous insulation applied to the conductor, the resinous insulation comprising a heat-treated resinous composition of (A) 100 parts by weight of a polyamide resin composition derived by admixing and heating (1) from about 1 mole to 2 moles of an unsaturated acidic compound selected from the group consisting of maleic acid, maleic anhydride, fumaric acid, dibutylmoleate and the monomethyl substitution derivatives for the noncarboxyl hydrogen and one thereof and (2) one mole of a polyamide reaction product having terminal amino groups and having an average molecular weight of not in excess of 1500, said polyamide having terminal amino groups being derived by reacting one mole of a primary hydrocarbon diamine having from 2 to 6 carbon atoms, and from 0.1 mole to 0.9 mole of a dicarboxylic acid selected from the group consisting of isophthalic acid, terephthalic acid, and aliphatic dicarboxylic acids and anhydrides thereof having no ethylenic unsaturation and having at least two and no more than eight noncarboxyl carbon atoms, the acids having no other reactive groups than the carboxyl groups and the anhydrides having no other reactive groups than the anhydride groups and (B) from 1 part to 50 parts by weight of a phenyl methyl siloxane resin having a ratio of total number of phenyl and methyl groups to silicon of from 1.3 to 1.95.

3. An insulated conductor comprising, in combination, an electrical conductor and solid resinous insulation applied to the conductor, the resinous insulation comprising a heat-treated resinous composition of (A) 100 parts by weight of a polyamide resin composition derived by admixing and heating (1) from about 1 mole to 2 moles of dibutylmaleate and (2) one mole of a polyamide having terminal amino groups and having an average molecular weight of not in excess of 1500, said polyamide having terminal amino groups being derived by reacting one mole of hexamethylenediamine and from 0.1 mole to 0.9 mole of isophthalic acid and (B) from 1 part to 50 parts by weight of a phenyl methyl siloxane resin having a ratio of total number of phenyl and methyl groups to silicon of from 1.3 to 1.95.

4. A resinous composition comprising, in combination, (A) 100 parts by weight of a polyamide resin composition derived by admixing and heating (1) from about 1 mole to 2 moles of an unsaturated acidic compound selected from the group consisting of maleic acid, maleic anhydride, fumaric acid, dibutylmaleate and the monomethyl substitution derivatives for the noncarboxyl hydrogen thereof and (2) one mole of a polyamide reaction product having terminal amino groups and having an average molecular weight of not in excess of 1500, said polyamide having terminal amino groups being derived by reacting one mole of a primary hydrocarbon diamine having from 2 to 6 carbon atoms, and from 0.1 mole to 0.9 mole of a dicarboxylic acid selected from the group consisting of isophthalic acid, terephthalic acid, and aliphatic dicarboxylic acids and anhydrides thereof having no ethylenic unsaturation and having at least two and no more than eight noncarboxyl carbon atoms, the acids having no other reactive groups than the carboxyl groups and the anhydrides having no other reactive groups than the anhydride groups and (B) from 1 part to 50 parts by weight of a solvent soluble, heat-hardenable organosiloxane resin having from 1.3 to 1.95 hydrocarbon groups per silicon atom.

5. The resinous composition of claim 4 wherein the organosiloxane resin is a phenyl methyl siloxane resin having a ratio of total number of phenyl and methyl groups to silicon of from 1.3 to 1.95.

6. A resinous composition comprising, in combination, (A) 100 parts by weight of a polyamide resin composition derived by admixing and heating (1) from about 1 mole to 2 moles of dibutylmaleate and (2) one mole of a polyamide having terminal amino groups and having an average molecular weight of not in excess of 1500, said polyamide having terminal amino groups being derived by reacting one mole of hexamethylenediamine and from 0.1 mole to 0.9 mole of isophthalic acid and (B) from 1 part to 50 parts by weight of a phenyl methyl siloxane resin having a ratio of total number of phenyl and methyl groups to silicon of from 1.3 to 1.95.

7. A resinous composition consisting of the reaction product derived by admixing and heating to reaction from 1.0 mole to 1.6 moles of isophthalic acid for each 2 moles of hexamethylenediamine and thereafter admixing and heating the reaction product thus produced with from 0.4 mole to 1.6 moles of dibutylmaleate at a temperature of from about 165° C. to 180° C.

8. A resinous composition consisting of the reaction product derived by admixing and heating to reaction one mole of a primary hydrocarbon diamine having from 2 to 6 carbon atoms and from 0.1 mole to 0.9 mole of a dicarboxylic acid selected from the group consisting of isophthalic acid, terephthalic acid, and aliphatic dicarboxylic acids and anhydrides thereof having no ethylenic unsaturation and having at least two and no more than eight noncarboxyl carbon atoms, the acids having no other reactive groups than the carboxyl groups and the anhydrides having no other reactive groups than the anhydride groups and thereafter admixing and heating to reaction 1 mole of the reaction product thus produced with from about 1 mole to 2 moles of an unsaturated acidic compound selected from the group consisting of maleic acid, maleic anhydride, fumaric acid, dibutylmaleate and the monomethyl substitution derivatives for the noncarboxyl hydrogen thereof.

9. A resinous composition consisting essentially of the reaction product derived by admixing and heating to reaction from 1.0 mole to 1.6 moles of isophthalic acid for each two moles of hexamethylenediamine and thereafter admixing and heating to reaction the reaction product thus produced with from 0.4 mole to 1.6 moles of fumaric acid.

10. An insulated conductor comprising, in combination, an electrical conductor and solid resinous insulation applied to the conductor, said resinous insulation comprising the heat-treated product of reaction derived by admixing and heating to reaction from 1.0 mole to 1.6 moles of isophthalic acid for each 2 moles of hexamethylendiamine and thereafter admixing and heating the reaction product thus produced with from 0.4 mole to 1.6 moles of dibutylmaleate at a temperature of from about 165° C. to 180° C.

11. A resinous composition consisting of the reaction product derived by admixing and heating to reaction from 1.0 mole to 1.6 moles of a dicarboxylic acid selected from the group consisting of isophthalic acid, terephthalic acid, and aliphatic dicarboxylic acids and anhydrides thereof having no ethylenic unsaturation and having at least two and no more than eight noncarboxyl carbon atoms, the acids having no other reactive groups than the carboxyl groups and the anhydrides having no other reactive groups than the anhydride groups, for each 2 moles of a primary hydrocarbon diamine having from 2 to 6 carbon atoms, and thereafter admixing and heating the reaction product thus produced with from 0.4 mole to 1.6 moles of dibutylmaleate at a temperature of from about 165° C. to about 180° C.

12. An insulated conductor comprising, in combination, an electrical conductor and solid resinous insulation applied to the conductor, the resinous insulation comprising a heat-treated resinous composition derived by admixing and heating to reaction from about 1.0 mole to about 1.6 moles of a dicarboxylic acid selected from the group consisting of isophthalic acid, terephthalic acid, and aliphatic dicarboxylic acids and anhydrides thereof having no ethylenic unsaturation and having at least two and no more than eight noncarboxyl carbon atoms, the acids having no other reactive groups than the carboxyl groups and the anhydrides having no other reactive groups than the anhydride groups, for each 2 moles of a primary hydrocarbon diamine having from 2 to 6 carbon atoms, and thereafter admixing and heating the reaction product thus produced with from 0.4 mole to 1.6 moles of dibutylmaleate at a temperature of from about 165° C. to about 180° C.

References Cited in the file of this patent

UNITED STATES PATENTS

| | | |
|---|---|---|
| 2,516,030 | Swiss | July 18, 1950 |
| 2,523,037 | Mathes | Sept. 19, 1950 |
| 2,823,195 | Shorr et al. | Feb. 11, 1958 |

FOREIGN PATENTS

| | | |
|---|---|---|
| 542,874 | Great Britain | Jan. 30, 1942 |
| 587,446 | Great Britain | Apr. 25, 1947 |